United States Patent
Lee et al.

(10) Patent No.: US 12,283,683 B2
(45) Date of Patent: Apr. 22, 2025

(54) CATHODE ELECTROCATALYST FOR METAL-AIR BATTERIES AND PRODUCTION PROCESS THEREOF

(71) Applicant: National Kaohsiung University of Science and Technology, Kaohsiung (TW)

(72) Inventors: Chun-I Lee, Kaohsiung (TW); Chun-Jern Pan, Kaohsiung (TW); Yu-Ssu Kuo, Kaohsiung (TW)

(73) Assignee: NATIONAL KAOHSIUNG UNIVERSITY OF SCIENCE AND TECHNOLOGY, Kaohsiung (TW)

(*) Notice: Subject to any disclaimer, the term of this patent is extended or adjusted under 35 U.S.C. 154(b) by 512 days.

(21) Appl. No.: 17/563,163

(22) Filed: Dec. 28, 2021

(65) Prior Publication Data
US 2023/0125532 A1     Apr. 27, 2023

(30) Foreign Application Priority Data
Oct. 26, 2021   (TW) .................. 110139684

(51) Int. Cl.
H01M 12/06     (2006.01)
C01B 21/06     (2006.01)
(Continued)

(52) U.S. Cl.
CPC ......... *H01M 12/06* (2013.01); *C01B 21/0622* (2013.01); *H01M 4/8673* (2013.01);
(Continued)

(58) Field of Classification Search
None
See application file for complete search history.

(56) References Cited

U.S. PATENT DOCUMENTS

2009/0081550 A1*   3/2009   Inoue ............... H01M 4/362
                                                   429/223
2014/0170527 A1*   6/2014   Lee ................. H01M 4/88
                                                   423/365
(Continued)

FOREIGN PATENT DOCUMENTS

CN    107195878 A      9/2017
CN    110951455 A  *   4/2020  .............. C09K 3/00

OTHER PUBLICATIONS

Ramesh et al, Fabrication of manganese oxide@nitrogen doped graphene oxide/polypyrrole (MnO2@NGO/PPy) hybrid composite electrodes for energy storage devices, Aug. 14, 2019, JMR&T, pp. 4227-4238 (Year: 2019).*

(Continued)

*Primary Examiner* — Ula C Ruddock
*Assistant Examiner* — Mary Grace Byram
(74) *Attorney, Agent, or Firm* — MUNCY, GEISSLER, OLDS & LOWE, P.C.

(57) ABSTRACT

A process of producing a cathode electrocatalyst for metal-air batteries includes providing a carbon source suspension, a metal source solution, and a nitrogen source solution, subjecting the carbon source suspension and the metal source solution to a low-temperature hydrothermal reaction, subjecting a first precursor-containing product thus formed and the nitrogen source solution to a high-temperature hydrothermal reaction, and subjecting a second precursor (Continued)

thus formed to a heating treatment under a protective atmosphere. A cathode electrocatalyst produced by the process is also disclosed.

19 Claims, 2 Drawing Sheets

(51) Int. Cl.
    *H01M 4/86*     (2006.01)
    *H01M 4/88*     (2006.01)
    *H01M 4/90*     (2006.01)
    *H01M 12/08*     (2006.01)

(52) U.S. Cl.
    CPC ....... *H01M 4/8825* (2013.01); *H01M 4/8885* (2013.01); *H01M 4/90* (2013.01); *H01M 4/9083* (2013.01); *H01M 12/08* (2013.01); *C01P 2002/72* (2013.01); *H01M 2004/8689* (2013.01)

(56) References Cited

U.S. PATENT DOCUMENTS

2014/0287908 A1*   9/2014   Lee ........................ C01B 32/23
                                                                                                             252/182.1
2015/0303487 A1*  10/2015   Kamai ................. C25B 11/043
                                                                                                            502/101

OTHER PUBLICATIONS

Machine English translation of CN110951455A originally published to Jia Apr. 3, 2020 (Year: 2020).*
Santos et al, Reduced graphene oxide as an excellent platform to produce a stable Brønsted acid catalyst for biodiesel production, Aug. 6, 2019, Fuel, pp. 1-10 (Year: 2019).*
Maki-Arvela et al, Effect of catalyst synthesis parameters on the metal particle size, Nov. 9, 2012, Applied Catalysis A: General, pp. 251-281 (Year: 2012).*
Machine English Translation of CN107195878A originally published to Cao Sep. 22, 2017 (Year: 2017).*

* cited by examiner

CATHODE ELECTROCATALYST FOR METAL-AIR BATTERIES AND PRODUCTION PROCESS THEREOF

CROSS-REFERENCE TO RELATED APPLICATION

This application claims priority of Taiwanese Patent Application No. 110139684, filed on Oct. 26, 2021.

FIELD

The present disclosure relates to an electrocatalyst for batteries and a production process thereof, and more particularly to a cathode electrocatalyst for metal-air batteries and a production process thereof.

BACKGROUND

CN 107195878 A discloses a process for producing a manganese (II) oxide/nitrogen-doped reduced graphene oxide composite electrode material. The process includes the following steps. Manganese (II) acetate tetrahydrate and urea are added into water, followed by evenly mixing through stirring, so as to obtain a solution. Graphene oxide is added to the solution, followed by stirring and even dispersion through ultrasonication, so as to obtain a mixture. The mixture is subjected to a hydrothermal reaction, which is performed at a temperature ranging from 120° C. to 180° C. for 4 to 12 hours. The resultant product is subjected to filtration, washing, and drying, followed by heating under an inert atmosphere to a temperature ranging from 400° C. to 600° C. for a heating treatment to proceed for 2 to 5 hours. Therefore, the manganese (II) oxide/nitrogen-doped reduced graphene oxide composite electrode material is produced.

However, there is still a need to develop satisfactory electrode material for batteries.

SUMMARY

Therefore, a object of the present first disclosure is to provide a process of producing a cathode electrocatalyst for metal-air batteries, which can alleviate at least one of the drawbacks of the prior art. The process includes:
  providing a carbon source suspension that includes an inorganic carbon source, a metal source solution including a metal source and having a pH value ranging from 6.5 to 10.5, and a nitrogen source solution including a nitrogen source, the metal source being formed from a soluble ionic compound, the nitrogen source being formed from a nitrogen-containing organic compound;
  subjecting the carbon source suspension and the metal source solution to a low-temperature hydrothermal reaction so as to form a first precursor-containing product that includes a first precursor, the metal source from the metal source solution being doped on a surface of the inorganic carbon source from the carbon source suspension to form the first precursor of the first precursor-containing product, the low-temperature hydrothermal reaction being conducted at a temperature ranging from 70° C. to 85° C. for at least 20 hours;
  subjecting the first precursor-containing product and the nitrogen source solution to a high-temperature hydrothermal reaction, so that the nitrogen source from the nitrogen source solution is decomposed to form nitrogen atoms which are further bonded to the metal source on the first precursor so as to form a second precursor, the high-temperature hydrothermal reaction being conducted at a temperature exactly or substantially of 180° C. for at least 12 hours; and
  subjecting the second precursor to a heating treatment under a protective atmosphere, so that the second precursor undergoes a phase transition, the heating treatment being conducted at a temperature ranging from 200° C. to 900° C.

A second object of the present disclosure is to provide a cathode electrocatalyst for metal-air batteries, which can alleviate at least one of the drawbacks of the prior art, and which is produced by the aforesaid process.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
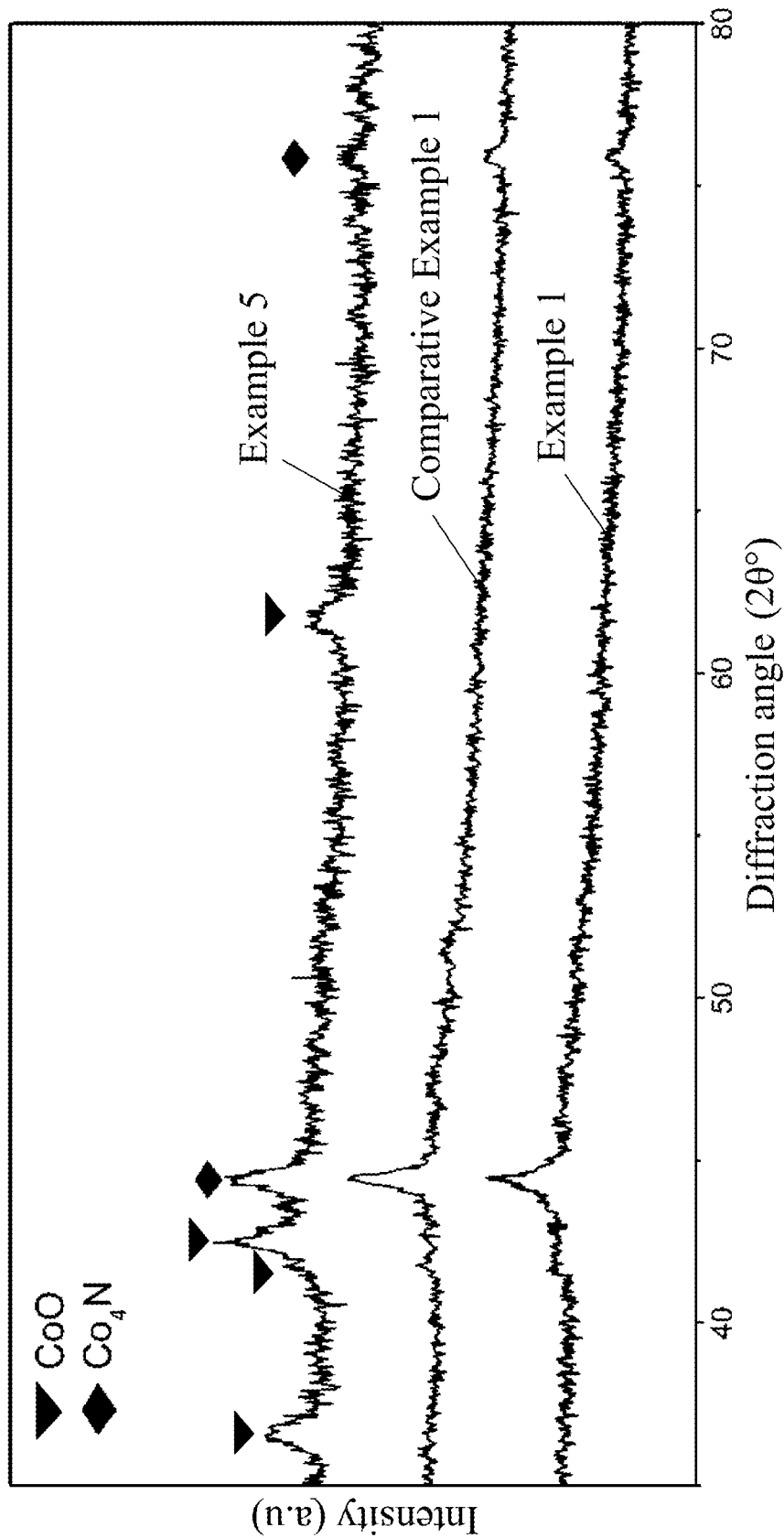
FIG. 1 shows X-ray diffractograms of cathode electrocatalysts of Examples 1 and 5 and Comparative Example 1.

The applicant found that an electrode material produced by a process including performing only a high-temperature hydrothermal reaction and then performing a heating treatment (as disclosed in CN 107195878 A) renders the service life of metal-air batteries unsatisfactory. In order to enhance the service life of metal-air batteries, the applicant endeavored to conceive an improved process of producing an electrode material.

Accordingly, the present disclosure provides a process of producing a cathode electrocatalyst for metal-air batteries, which includes:
  providing a carbon source suspension that includes an inorganic carbon source, a metal source solution including a metal source and having a pH value ranging from 6.5 to 10.5, and a nitrogen source solution including a nitrogen source, the metal source being formed from a soluble ionic compound, the nitrogen source being formed from a nitrogen-containing organic compound;
  subjecting the carbon source suspension and the metal source solution to a low-temperature hydrothermal reaction so as to form a first precursor-containing product that includes a first precursor, the metal source from the metal source solution being doped on a surface of the inorganic carbon source from the carbon source suspension to form the first precursor of the first precursor-containing product, the low-temperature hydrothermal reaction being conducted at a temperature ranging from 70° C. to 85° C. for at least 20 hours;
  subjecting the first precursor-containing product and the nitrogen source solution to a high-temperature hydrothermal reaction, so that the nitrogen source from the nitrogen source solution is decomposed to form nitrogen atoms which are further bonded to the metal source on the first precursor to form a second precursor, the high-temperature hydrothermal reaction being conducted at a temperature exactly or substantially of 180° C. for at least 12 hours; and subjecting the second precursor to a heating treatment under a protective atmosphere, so that the second precursor undergoes a phase transition, the heating treatment being conducted at a temperature ranging from 200° C. to 900° C.

According to the present disclosure, the carbon source suspension may be prepared by dispersing the inorganic carbon source in a dispersion medium.

According to the present disclosure, the inorganic carbon source may have a large surface area. In certain embodiments, the inorganic carbon source has a surface area of at least 50 m$^2$/g, so that the cathode electrocatalyst produced can enable a metal-air battery to have more satisfactory performance.

According to the present disclosure, the inorganic carbon source may be selected from the group consisting of conductive carbon black, graphene, activated carbon, carbon fibers, carbon nanotubes, and combinations thereof. In an exemplary embodiment, the inorganic carbon source is conductive carbon black.

According to the present disclosure, the dispersion medium is not particularly limited to any type of medium. Any liquid that can disperse the inorganic carbon source can be used as the dispersion medium. The dispersion medium may be an alcohol.

According to the present disclosure, the inorganic carbon source may be present in an amount ranging from 0.20 wt % to 0.45 wt % based on a total weight (i.e. 100 wt %) of the carbon source suspension, so that the dispersibility of the inorganic carbon source in the dispersion medium can be enhanced. In certain embodiments, the inorganic carbon source is present in an amount ranging from 0.25 wt % to 0.40 wt % based on the total weight of the carbon source suspension. In other embodiments, the inorganic carbon source is present in an amount ranging from 0.30 wt % to 0.35 wt % based on the total weight of the carbon source suspension.

According to the present disclosure, the metal source solution may be prepared by dissolving the soluble ionic compound in a first solvent to form an ionic compound solution, and by subsequently making a pH adjustment to the ionic compound solution. The cathode electrocatalyst produced using the metal source solution having a pH value ranging from 6.5 to 10.5 can enable a metal-air battery to have satisfactory performance.

According to the present disclosure, the metal source may be formed from any 3d transition metal. The metal source may be selected from the group consisting of a cobalt source, a manganese source, an iron source, a nickel source, a chromium source, and combinations thereof. In an exemplary embodiment, the metal source is a cobalt source.

According to the present disclosure, the soluble ionic compound may be selected from the group consisting of cobalt acetate, manganese acetate, iron acetate, nickel acetate, chromium acetate, and combinations thereof.

According to the present disclosure, the first solvent is not particularly limited to any type of solvent. Any solvent that can dissolve the soluble ionic compound can be used as the first solvent. In an exemplary embodiment, the first solvent is water.

According to the present disclosure, a molarity of the soluble ionic compound in the ionic compound solution may range from 0.2 mol/L to 0.6 mol/L. In certain embodiments, the molarity of the soluble ionic compound in the ionic compound solution ranges from 0.35 mol/L to 0.45 mol/L. Namely, a molarity of the metal source in the metal source solution may range from 0.2 mol/L to 0.6 mol/L, and in certain embodiments, the molarity of the metal source in the metal source solution ranges from 0.35 mol/L to 0.45 mol/L.

According to the present disclosure, the nitrogen source solution may be prepared by dissolving the nitrogen-containing organic compound in a second solvent to form the nitrogen source.

Any nitrogen-containing organic compound, which has nitrogen atoms in the structure thereof, and a nitrogen source formed from which can be decomposed to release the nitrogen atoms, is suitable for the present disclosure. The nitrogen-containing organic compound may be selected from the group consisting of urea, N-methylurea, N-ethylurea, acetamide, formamide, N-methylformamide, acrylamide, and combinations thereof. In certain embodiments, the nitrogen-containing organic compound is urea.

According to the present disclosure, the second solvent is not particularly limited to any type of solvent. Any solvent that can dissolve the nitrogen-containing organic compound can be used as the second solvent. In an exemplary embodiment, the second solvent is water.

According to the present disclosure, a molarity of the nitrogen source in the nitrogen source solution may range from 0.8 mol/L to 6.7 mol/L. In certain embodiments, the molarity of the nitrogen source in the nitrogen source solution ranges from 1.67 mol/L to 4.5 mol/L.

According to the present disclosure, a ratio of the molarity of the metal source in the metal source solution to that of the nitrogen source in the nitrogen (abbreviated as molarity ratio hereinafter) in decimal form may range from 0.06 to 0.5, so that the cathode electrocatalyst produced can enable a metal-air battery to have more satisfactory performance. In certain embodiments, the molarity ratio in decimal form ranges from 0.08 to 0.24. In other embodiments, the molarity ratio in decimal form ranges from 0.096 to 0.16.

The time required to conduct the low-temperature hydrothermal reaction (i.e. at least 20 hours) indicates that the first precursor can be formed only by performing the low-temperature hydrothermal reaction at the temperature ranging from 70° C. to 85° C. for at least 20 hours. Therefore, the time required to conduct the low-temperature hydrothermal reaction can be more than 20 hours.

The time required to conduct the high-temperature hydrothermal reaction (i.e. at least 12 hours) indicates that the second precursor can be formed only by performing the high-temperature hydrothermal reaction at the temperature exactly or substantially of 180° C. for at least 12 hours. Therefore, the time required to conduct the high-temperature hydrothermal reaction can be more than 12 hours.

According to the present disclosure, the temperature substantially of 180° C. for conducting the high-temperature hydrothermal reaction ma y be 180° C.±2° C.

According to the present disclosure, the protective atmosphere may be selected from the group consisting of a hydrogen gas, an argon gas, a nitrogen gas, an ammonia gas, and combinations thereof. In an exemplary embodiment, the protective atmosphere is a combination of a hydrogen gas and an argon gas.

According to the present disclosure, the time for conducting the heating treatment is not particularly limited, and may be adjusted based on the temperature of the heating treatment.

The present disclosure also provides a cathode electrocatalyst for metal-air batteries, which is produced by the aforesaid production process. Such cathode electrocatalyst is particularly suitable for making a metal-air rechargeable battery, and can enable the metal-air rechargeable battery to have not only satisfactory performance but also a longer service life.

According to the present disclosure, the cathode electrocatalyst may include a $Co_4N$ crystal phase, and may have an X-ray diffractogram obtainable through X-ray diffraction analysis. The X-ray diffractogram may have a major peak exactly or substantially at 44.5° that represents the $Co_4N$ crystal phase.

The present disclosure will be further described by way of the following examples. However, it should be understood that the following examples are intended solely for the purpose of illustration and should not be construed as s limiting the present disclosure in practice.

Production of Cathode Electrocatalyst for Metal-Air Batteries

Example 1

20 mg of conductive carbon black (Manufacturer: Cabot Corporation; Catalog No.: VXC-72R) was added into 8 mL of an alcohol, followed by conducting ultrasonic vibration for 10 minutes so that the conductive carbon black was evenly dispersed in the alcohol to obtain a carbon source suspension. Based on the total weight (i.e. 100 wt %) of the carbon source suspension, the amount of the conductive carbon black was 0.32 wt %. Cobalt acetate was dissolved in deionized water to prepare an ionic compound solution containing cobalt acetate at a molarity of 0.4 mol/L. Subsequently, 0.16 mL of an ammonia solution was added into 0.6 mL of the ionic compound solution to adjust the pH value, such that a metal source solution having a pH value of 8.69 and containing a cobalt source at a molarity of 0.4 mol/L was prepared. 2.0 g of urea was dissolved in 10 mL of deionized water to prepare a nitrogen source solution containing a nitrogen source at a molarity of 3.33 mol/L. Specifically, the nitrogen source was formed from urea.

The carbon source suspension and the metal source suspension were evenly mixed in a glass bottle, followed by sealing the glass bottle. The glass bottle was placed in a silicone oil bath of 80° C. and continuously heated for 20 hours for a low-temperature hydrothermal reaction to proceed, so that a first precursor-containing product was formed. Specifically, during the low-temperature hydrothermal reaction, the cobalt source from the metal source solution was doped on the surface of the conductive carbon black from the carbon source suspension to form the first precursor in the first precursor-containing product.

The nitrogen source solution and the first precursor-containing product were mixed, followed by ultrasonic vibration for 30 minutes. The resultant mixture was placed in a hydrothermal reactor. Subsequently, the hydrothermal reactor was placed in an industrial oven and continuously heated at 180° C. for 12 hours for a high-temperature hydrothermal reaction to proceed, so as to form a second precursor-containing product. Specifically, during the high-temperature hydrothermal reaction, the nitrogen source from the nitrogen source solution was decomposed to form nitrogen atoms, which were further bonded to the cobalt source of the first precursor to form the second precursor of the second precursor-containing product. After completion of the high-temperature hydrothermal reaction, the hydrothermal reactor was allowed to cool down, and the second precursor-containing product in the form of black powder was taken out from the hydrothermal reactor. The second precursor-containing product and an anhydrous alcohol were mixed, followed by conducting a centrifugation process (at 4200 rpm for 5 minutes) twice. The pellet thus obtained was placed in an oven having a temperature of 70° C. for drying. Therefore, the second precursor in powder form was isolated.

The second precursor was subjected to a heating treatment at 400° C. for 1 hour under a mixed atmosphere composed of a hydrogen gas (20%) and an argon gas (80%). Thus, the cathode electrocatalyst of Example 1 was produced.

Examples 2 to 5

The cathode electrocatalysts of Examples 2 to 5 were produced generally according to the procedure for producing that of Example 1, except that the amount of urea was modified for producing Examples 2 to 4, and that N-methylurea was used instead of urea for producing Example 5. The differences in detail are described as follows. For producing Example 2, 0.5 g of urea was used to prepare a nitrogen source solution containing a nitrogen source at a molarity of 0.83 mol/L. For producing Example 3, 1.0 g of urea was used to prepare a nitrogen source solution containing a nitrogen source at a molarity of 1.67 mol/L. For producing Example 4, 3.0 g of urea was used to prepare a nitrogen source solution containing a nitrogen source at a molarity of 5 mol/L. For producing Example 5, 2.0 g of N-methylurea was used to prepare a nitrogen source solution containing a nitrogen source at a molarity of 2.7 mol/L.

Comparative Example 1

The carbon source suspension, the metal source solution, and the nitrogen source solution for producing Comparative Example 1 were prepared according to the procedures for preparing those for producing Example 1.

The carbon source suspension, the metal source solution, and the nitrogen source solution were mixed under vibration for 30 minutes. The resultant mixture was placed in a hydrothermal reactor. The hydrothermal reactor was placed in an industrial oven and continuously heated at 180° C. for 12 hours for a high-temperature hydrothermal reaction to proceed, so as to form a precursor-containing crude product. Specifically, during the high-temperature hydrothermal reaction, the nitrogen source from the nitrogen source solution was decomposed to form nitrogen atoms, and the nitrogen atoms and the cobalt source from the metal source solution were together doped on the surface of the conductive carbon black from the carbon source suspension to form the precursor of the precursor-containing crude product. After completion of the high-temperature hydrothermal reaction, the hydrothermal reactor was allowed to cool down, and the precursor-containing crude product in the form of black powder was taken out from the hydrothermal reactor. The precursor-containing crude product and an anhydrous alcohol were mixed, followed by conducting a centrifugation process (at 4200 rpm for 5 minutes) twice. The pellet thus obtained was placed in an oven having a temperature of 70° C. for drying. Therefore, the precursor in powder form was isolated.

The precursor was subjected to a heating treatment at 400° C. for 1 hour under a mixed atmosphere composed of a hydrogen gas (20%) and an argon gas (80%). Thus, the cathode electrocatalyst of Comparative Example 1 was produced.

Property Evaluation

X-Ray Diffraction (XRD) Analysis for Cathode Electrocatalyst

The cathode electrocatalysts of Examples 1 and 5 and Comparative Example 1 were subjected to XRD analysis using an X-ray diffractometer (Bruker, D8 Advance). The X-ray diffractograms thus obtained are shown in FIG. 1.

Generally speaking, when a cobalt source serves as the metal source, the cathode electrocatalyst thus produced has a $Co_4N$ crystal phase which can prolong the service life of a metal-air battery.

Referring to FIG. 1, the cathode electrocatalysts of Example 1 and Comparative Example 1 had a $Co_4N$ crystal phase. However, after conducting an analysis on the full width at half maximum intensity (FWHM) of a major peak at about 44.5° through the Scherrer equation, it was found that the FWHM of the cathode electrocatalyst of Example 1 was slightly smaller the cathode electrocatalyst of than that of Comparative Example 1, indicating that the $Co_4N$ crystal phase of the cathode electrocatalyst of Example 1 was better than that of the cathode electrocatalyst of Comparative Example 1 and could prolong the service life of a metal-air battery.

Performance Test for Zinc-Air Rechargeable Battery Employing Cathode Electrocatalyst 35 mg of the cathode electrocatalyst of Example 1, 20 μL of 20% PTFE (polytetrafluoroethylene) serving as an adhesive, and a tiny amount of an alcohol were evenly mixed to prepare a catalyst slurry. The catalyst slurry was evenly coated on a surface of nickel foam having an area of 1 $cm^2$. Subsequently, the coated nickel foam was immersed in 20% PTFE, such that the catalyst slurry tightly adhered to the surface of the nickel foam. NiFe layered double hydroxide (LDH) was evenly coated on the surface of the nickel foam having the catalyst slurry so as to prepare an air electrode. Afterwards, a pure zinc metal electrode, an electrolyte (composed of a 6 M potassium hydroxide aqueous solution and a 0.2 M zinc acetate aqueous solution), and the air electrode were assembled to make a zinc-air rechargeable battery (also referred to as zinc-air secondary battery).

The zinc-air rechargeable battery was subjected to charge/discharge cycle testing for evaluating the performance thereof using a high-performance battery testing system (Neware, CT4008) under a respective one of the following three test conditions:

(1) at an ambient temperature which was room temperature, the zinc-air rechargeable battery was charged at a current density of 5 mA/$cm^2$ for 1 hour upon each charge cycle, and was discharged at a current density of 5 mA/$cm^2$ for 1 hour upon each discharge cycle;

(2) at an ambient temperature which was room temperature, the zinc-air rechargeable battery was charged at a current density of 10 mA/$cm^2$ for 1 hour upon each charge cycle, and was discharged at a current density of 10 mA/$cm^2$ for 1 hour upon each discharge cycle; and (3) at an ambient temperature which was room temperature, the zinc-air rechargeable battery was charged at a current density of 20 mA/$cm^2$ for 1 hour upon each charge cycle, and was discharged at a current density of 20 mA/$cm^2$ for 1 hour upon each discharge cycle.

The cathode electrocatalysts of Examples 2 to 5 and Comparative Example 1 were used to make corresponding zinc-air rechargeable batteries according to the aforesaid procedure for making the zinc-air rechargeable battery employing the cathode electrocatalyst of Example 1. The zinc-air rechargeable batteries respectively employing the cathode electrocatalysts of Examples 2 to 5 and Comparative Example 1 were subjected to charge/discharge cycle testing for evaluating the performance thereof using the aforesaid high-performance battery testing system under the test condition (1) described above.

The results are shown in Tables 1 and 2.

TABLE 1

| | | Example | | |
|---|---|---|---|---|
| | | 1 | 2 | 3 |
| Nitrogen source solution | Nitrogen-containing organic compound (amount) | Urea (2.0 g) | Urea (0.5 g) | Urea (1.0 g) |
| | Molarity of nitrogen source (mol/L) | 3.33 | 0.83 | 1.67 |
| Molarity ratio of cobalt source to nitrogen source in decimal form | | 0.12 | 0.48 | 0.24 |
| Low-temperature hydrothermal reaction | | 80° C., 20 hours | | |
| High-temperature hydrothermal reaction | | 180° C., 12 hours | | |
| Heating treatment | | 400° C., 1 hour | | |
| Current density upon charging and discharging: 5 mA/$cm^2$ | Voltage upon oxygen reduction reaction (V) | 1.15 to 1.18 | | |
| | Time period of stable charging and discharging | $10^{th}$ hour to $900^{th}$ hour | $10^{th}$ hour to $600^{th}$ hour | $10^{th}$ to $850^{th}$ hour |
| | Time of reaching voltage reduction to 1.1 V upon discharging | $1500^{th}$ hour | $1050^{th}$ hour | $1400^{th}$ hour |
| Current density upon charging and discharging: 10 mA/$cm^2$ | Time of reaching voltage reduction to 1.0 V upon discharging | $1080^{th}$ hour | Not determined | Not determined |
| Current density upon charging and discharging: 20 mA/$cm^2$ | Time of reaching voltage reduction to 0.9 V upon discharging | $610^{th}$ hour | Not determined | Not determined |

TABLE 2

| | | Example | | Comparative |
|---|---|---|---|---|
| | | 4 | 5 | Example 1 |
| Nitrogen source solution | Nitrogen-containing organic compound (amount) | Urea (3.0 g) | N-methylurea (2.0 g) | Urea (2.0 g) |
| | Molarity of nitrogen source (mol/L) | 5 | 2.7 | 3.33 |

TABLE 2-continued

|  |  | Example | | Comparative |
|---|---|---|---|---|
|  |  | 4 | 5 | Example 1 |
| Molarity ratio of cobalt source to nitrogen source in decimal form | | 0.08 | 0.14 | 0.12 |
| Low-temperature hydrothermal reaction | | 80° C., 20 hours | | Not conducted |
| High-temperature hydrothermal reaction | | 180° C., 12 hours | | |
| Heating treatment | | 400° C., 1 hour | | |
| Current density upon charging and discharging: 5 mA/cm$^2$ | Voltage upon oxygen reduction reaction (V) | 1.15 to 1.18 | 1.13 to 1.15 | 1.13 to 1.15 |
| | Time period of stable charging and discharging | 10$^{th}$ hour to 500$^{th}$ hour | 10$^{th}$ hour to 600$^{th}$ hour | 10$^{th}$ to 600$^{th}$ hour |
| | Time of reaching voltage reduction to 1.1 V upon discharging | 850$^{th}$ hour to 900$^{th}$ hour | 950$^{th}$ hour | 870$^{th}$ hour |
| Current density upon charging and discharging: 10 mA/cm$^2$ | Time of reaching voltage reduction to 1.0 V upon discharging | Not determined | | |
| Current density upon charging and discharging: 20 mA/cm$^2$ | Time of reaching voltage reduction to 0.9 V upon discharging | Not determined | | |

Generally speaking, the theoretical value of the voltage upon the oxygen reduction reaction (ORR) of a zinc-air rechargeable battery is 1.23 V. Therefore, when the actual value of the voltage upon the ORR of the zinc-air rechargeable battery is closer to 1.23 V, the zinc-air rechargeable battery has better performance. When the zinc-air rechargeable battery has a longer time period of stable charging and discharging, the zinc-air rechargeable battery has a longer service life. After the time period of stable charging and discharging, the voltage upon the discharging of the zinc-air rechargeable battery gradually decreases with increase in the number of charge/discharge cycles, gradually weakening the performance of the zinc-air rechargeable battery. Therefore, considering the time when the voltage upon discharging is reduced to a certain level (for instance, 1.1 V, 1.0 V, or 0.9 V as illustrated in Tables 1 and 2), the longer time the zinc-air rechargeable battery takes for the voltage upon discharging to be reduced to that level, the longer service life the zinc-air rechargeable battery has.

Figure 2:
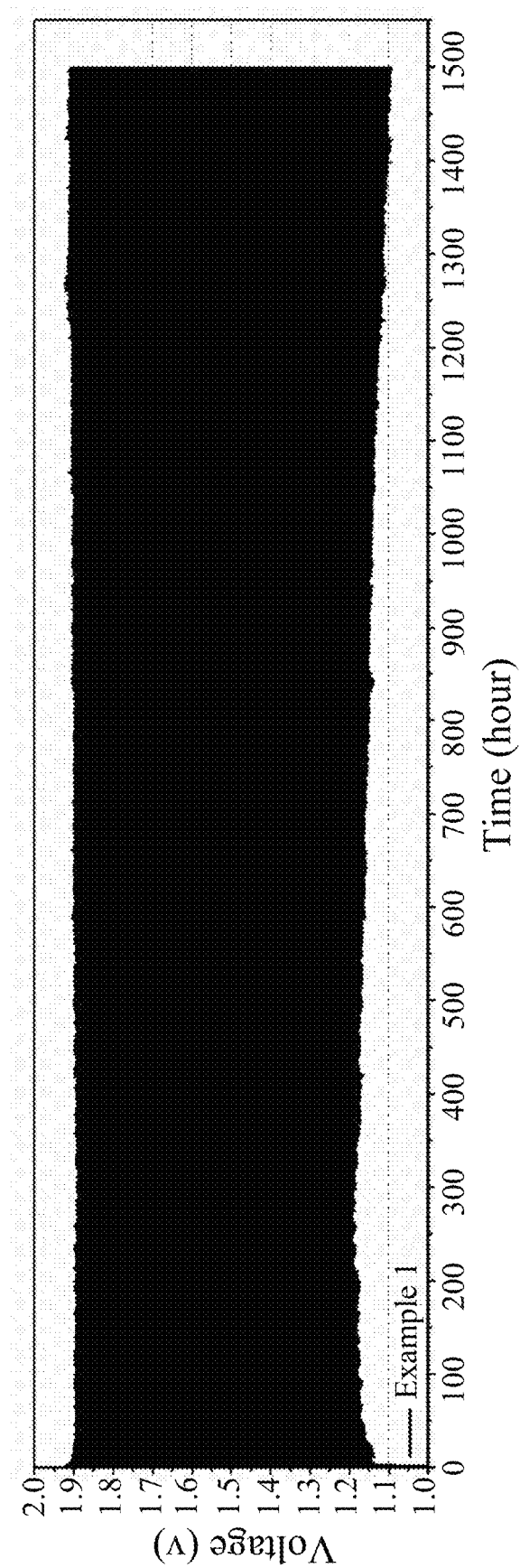
FIG. 2 shows a performance diagram of a zinc-air rechargeable battery employing the cathode electrocatalyst of Example 1, which was obtained by conducting charge/discharge cycle testing under the following test condition: at an ambient temperature that was room temperature, the zinc-air rechargeable battery was charged at a current density of 5 mA/cm$^2$ for 1 hour upon each charge cycle, and was discharged at a current density of 5 mA/cm$^2$ for 1 hour upon each discharge cycle.

Referring to Tables 1 and 2, under the test condition that the current density upon charging and discharging was 5 mA/cm$^2$, it can be observed, from the time of reaching voltage reduction to 1.1 V upon discharging, that each of the zinc-air rechargeable batteries employing the cathode electrocatalysts of Examples 1 to 5 had a longer service life compared to that employing the cathode electrocatalyst of Comparative Example 1. Furthermore, the cathode electrocatalysts of Example 1 and Comparative Example 1, which were both produced using 2.0 g of urea, were subjected to the following comparison. Compared to the zinc-air rechargeable battery employing the cathode electrocatalyst of Comparative Example 1, the voltage upon the ORR of the zinc-air rechargeable battery employing the cathode electrocatalyst of Example 1 was closer to the theoretical value (i.e. 1.23 V), had a longer time period of stable charging and discharging, and took a longer time to reach voltage reduction to 1.1 V upon discharging (also see FIG. 2). Such comparison shows that the cathode electrocatalyst of Example 1 enabled the zinc-air rechargeable battery employing the same to have better performance and a longer service life.

In view of the foregoing, compared to a conventional cathode electrocatalyst produced only through a high-temperature hydrothermal reaction, the cathode electrocatalyst of the present disclosure, which is produced by first conducting a low-temperature hydrothermal reaction and then conducting a high-temperature hydrothermal reaction, can enable a zinc-air rechargeable battery to have better performance and a longer service life.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A process of producing a cathode electrocatalyst for metal-air batteries, comprising:
   providing a carbon source suspension that includes an inorganic carbon source, a metal source solution including a metal source and having a pH value ranging from 6.5 to 10.5, and a nitrogen source solution including a nitrogen source, the metal source being formed from a soluble ionic compound, the nitrogen source being formed from a nitrogen-containing organic compound;
   subjecting the carbon source suspension and the metal source solution to a low-temperature hydrothermal reaction so as to form a first precursor-containing product that includes a first precursor, the metal source from the metal source solution being doped on a surface of the inorganic carbon source from the carbon source suspension to form the first precursor of the first precursor-containing product, the low-temperature hydrothermal reaction being conducted at a temperature ranging from 70° C. to 85° C. for at least 20 hours;

subjecting the first precursor-containing product and the nitrogen source solution to a high-temperature hydrothermal reaction, so that the nitrogen source from the nitrogen source solution is decomposed to form nitrogen atoms which are further bonded to the metal source on the first precursor to form a second precursor, the high-temperature hydrothermal reaction being conducted at a temperature exactly or substantially of 180° C. for at least 12 hours; and subjecting the second precursor to a heating treatment under a protective atmosphere, so that the second precursor undergoes a phase transition, the heating treatment being conducted at a temperature ranging from 200° C. to 900° C.

2. The process according to claim 1, wherein a ratio of a molarity of the metal source in the metal source solution to that of the nitrogen source in the nitrogen source solution in decimal form ranges from 0.06 to 0.5.

3. The process according to claim 2, wherein the ratio of the molarity of the metal source in the metal source solution to that of the nitrogen source in the nitrogen source solution in decimal form ranges from 0.08 to 0.24.

4. The process according to claim 3, wherein the ratio of the molarity of the metal source in the metal source solution to that of the nitrogen source in the nitrogen source solution in decimal form ranges from 0.096 to 0.16.

5. The process according to claim 1, wherein the carbon source suspension is prepared by dispersing the inorganic carbon source in a dispersion medium, the inorganic carbon source having a surface area of at least 50 $m^2/g$ and being selected from the group consisting of conductive carbon black, graphene, activated carbon, carbon fibers, carbon nanotubes, and combinations thereof.

6. The process according to claim 3, wherein the inorganic carbon source is present in an amount ranging from 0.20 wt % to 0.45 wt % based on a total weight of the carbon source suspension.

7. The process according to claim 6, wherein the inorganic carbon source is present in an amount ranging from 0.25 wt % to 0.40 wt % based on the total weight of the carbon source suspension.

8. The process according to claim 7, wherein the inorganic carbon source is present in an amount ranging from 0.30 wt % to 0.35 wt % based on the total weight of the carbon source suspension.

9. The process according to claim 1, wherein the metal source solution is prepared by dissolving the soluble ionic compound in a first solvent to form an ionic compound solution, and by subsequently making a pH adjustment to the ionic compound solution, the metal source being selected from the group consisting of a cobalt source, a manganese source, an iron source, a nickel source, a chromium source, and combinations thereof, the soluble ionic compound being selected from the group consisting of cobalt acetate, manganese acetate, iron acetate, nickel acetate, chromium acetate, and combinations thereof.

10. The process according to claim 9, wherein a molarity of the metal source in the metal source solution ranges from 0.2 mol/L to 0.6 mol/L.

11. The process according to claim 10, wherein the molarity of the metal source in the metal source solution ranges from 0.35 mol/L to 0.45 mol/L.

12. The process according to claim 1, wherein the nitrogen source solution is prepared by dissolving the nitrogen-containing organic compound in a second solvent to form the nitrogen source, the nitrogen-containing organic compound being selected from the group consisting of urea, N-methylurea, N-ethylurea, acetamide, formamide, N-methylformamide, acrylamide, and combinations thereof.

13. The process according to claim 12, wherein a molarity of the nitrogen source in the nitrogen source solution ranges from 0.8 mol/L to 6.7 mol/L.

14. The process according to claim 13, wherein the molarity of the nitrogen source in the nitrogen source solution ranges from 1.67 mol/L to 4.5 mol/L.

15. The process according to claim 1, wherein the protective atmosphere is selected from the group consisting of a hydrogen gas, an argon gas, a nitrogen gas, an ammonia gas, and combinations thereof.

16. The process according to claim 15, wherein the protective atmosphere is a combination of a hydrogen gas and an argon gas.

17. A cathode electrocatalyst for metal-air batteries, which is produced by a process according to claim 1.

18. The cathode electrocatalyst according to claim 17, comprising a CON crystal phase.

19. The cathode electrocatalyst according to claim 17, which has an X-ray diffractogram obtainable through X-ray diffraction analysis, the X-ray diffractogram having a major peak exactly or substantially at 44.5° that represents the COIN crystal phase.

* * * * *

UNITED STATES PATENT AND TRADEMARK OFFICE
CERTIFICATE OF CORRECTION

PATENT NO. : 12,283,683 B2
APPLICATION NO. : 17/563163
DATED : April 22, 2025
INVENTOR(S) : Chun-I Lee et al.

Page 1 of 1

It is certified that error appears in the above-identified patent and that said Letters Patent is hereby corrected as shown below:

In the Claims

In Column 12, at Line 41, change: "CON" to -- $Co_4N$ --

In Column 12, at Line 46, change: "COIN" to -- $Co_4N$ --

Signed and Sealed this
Seventeenth Day of June, 2025

Coke Morgan Stewart
*Acting Director of the United States Patent and Trademark Office*